3,816,424
BENZENESULFONAMIDOPYRIMIDINES
Rudi Weyer, Frankfurt am Main, Walter Aumuller, Kelkheim, Taunus, Roland Schweitzer, Falkenstein, Taunus, Helmut Weber, Frankfurt am Main, and Manfred Hubner, Ludwigshafen am Rhine, Germany, assignors to Farbwerke Hoechst Aktiengesellschaft vormals Meister Lucius & Bruning, Frankfurt am Main, Germany
No Drawing. Filed Feb. 15, 1972, Ser. No. 226,530
Int. Cl. C07d 57/00
Claims priority, application Germany, Feb. 17, 1971, P 21 07 557.0
U.S. Cl. 260—256.5 R    5 Claims

ABSTRACT OF THE DISCLOSURE

New sulfonamidopyrimidines with hypoglycemic properties having the formula

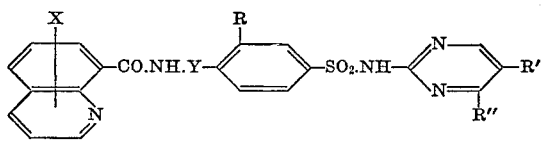

in which

X represents hydrogen, chlorine, bromine, methyl, methoxy

Y represents —CH($CH_3$)—$CH_2$—, or, preferably,

—$CH_2$—$CH_2$—

R represents hydrogen or, together with Y, a bridge of 3 or 4 carbon atoms,

R' represents alkyl, cycloalkyl, cycloalkylalkyl, aryl, aralkyl, alkoxy, cycoalkoxy, alkoxyalkyl, alkoxyalkoxy, alkylmercapto, alkylmercaptoalkyl, the alkyl containing, in any case from 1 to 4 carbon atoms and the cycloalkyl, in any case, 5 to 8 carbon atoms, R" represents hydrogen, lower alkyl, R" and R' together being able to form a ring of from 3 to 5 methyl groups, and physiologically tolerable salts thereof and processes for their preparation.

The present invention relates to sulfonamidopyrimidines of the formula

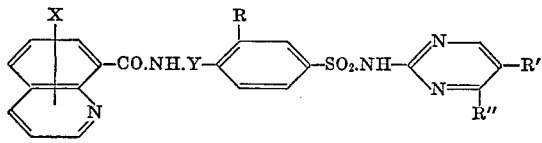

which have in the free form or in the form of their salts hypoglycemic properties and are distinguished by a strong and long lasting hypoglycemic action.

In the above formula

X represents hydrogen, chlorine, bromine, methyl, methoxy

Y represents —CH($CH_3$)—$CH_2$, or, preferably,

—$CH_2$—$CH_2$—

R represents hydrogen or, together with Y, a bridge of 3 or 4 carbon atoms,

R' represents alkyl, cycloalkyl, cycloalkylalkyl, aryl, aralkyl, alkoxy, cycoalkoxy, alkoxyalkyl, alkoxyalkoxy, alkylmercapto, alkylmercaptoalkyl, the alkyl containing, in any case from 1 to 4 carbon atoms and the cycloalkyl, in any case, 5 to 8 carbon atoms, R" represents hydrogen, lower alkyl, R" and R' together being able to form a ring of from 3 to 5 methylene groups.

The present invention furthermore provides processes for the manufacture of these benzenesulfonamidopyrimidines which comprise (a) reacting compounds of formula

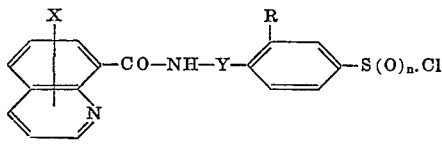

in which X, Y and R are defined as above and n is 0, 1 or 2, with 2-aminopyrimidines of the formula

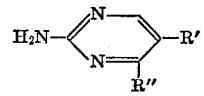

in which R' and R" are defined as above, and optionally oxydizing the compounds obtained to yield sulfonamides, or (b) reacting benzenesulfonylguanidines of the formula

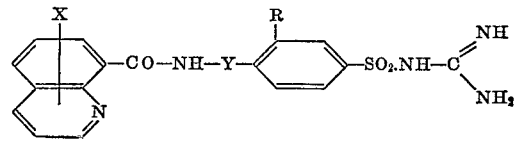

in which X, Y and R are defined as above with compounds of the formula

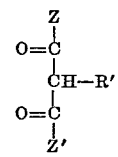

in which R' is defined as above and Z and Z' represent hydrogen or an alkoxy group, or Z also has the meaning of R" or of a functional derivative thereof, and if necessary the resulting pyrimidines, hydroxylated in 4- and/or 6-position are converted into the corresponding of R" or of a functional derivative thereof, and if dihalogenation into the desired pyrimidines, or (c) reacting benzenesulfonamides of the formula

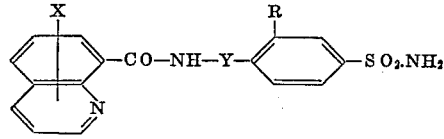

in which X, Y and R are defined as above, with a pyrimidene of the formula

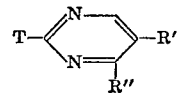

in which R″ and R′ are defined as above and T represents a reactive ester group, the group —NH·NO₂, NHCN or a low molecular trialkyl-ammonio group, or (d) reacting compounds of the formula

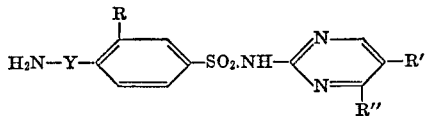

with reactive derivatives of the acid of the formula

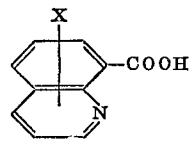

in which X is defined as above and, if desired, converting the reaction products into physiologically tolerable salts.

The reaction of starting materials mentioned under (a) is advantageously carried out in an inert solvent in the presence of a base such as pyridine or trimethylamine. But it is also possible to carry out process (a) with a molar excess of the aminopyrimidine to eliminate the hydrochloric acid formed during the reaction. The subsequent oxydation of the sulfenamides (n=0) or sulfinamides (n=1) is effected in known manner, for example by treatment with hydrogen peroxyde, potassium permanganate or nitric acid.

The condensation of the acylaminoalkyl-benzenesulfonyl-guanidines with the β-dicarbonyl compounds according to process (b) may be carried out, for example, by means of alkali alcoholate in alcohol. The β-dicarbonyl compounds are used, to this effect, in free form or as functional derivatives, for example, acetals; they may also be manufactured by one procedure without isolating the intermediate according to Vilsmeier from aldehyde acetals or corresponding enamines, inorganic acid chloride and di-alkyl formamide. When using corresponding substituted malonic diesters, malonic ester aldehydes or the functional derivatives thereof instead of the dicarbonyl compounds, the hydroxyl groups which are in 4- and/or 6-position of the pyrimidine ring must be replaced by halogen with the aid of an inorganic acid halide, which may then be easily exchanged by reduction, for example with zinc dust, against hydrogen.

The acylaminoalkylbenzenesulfonylguanidines used as starting compounds may be obtained, for example, by melting the acylaminoalkylbenzenesulfonamides with guanidine carbonate.

The condensation of the benzene guanidines with the pyrimidine derivatives according to (c) is preferably carried out in the presence of a base such as potassium carbonate.

As starting compounds for the reaction according to (c) there are especially suitable 2-halogenopyrimidines which are obtained by the reaction of the 2-hydroxy-pyrimidines with an excess of phosphoroxy-chloride. Instead of the 2-halogenopyrimidines there may also be reacted the corresponding trialkylammonio-, nitroamino- or cyanamino-pyrimidines.

The acylation of the aminoalkylbenzenesulfonamido-pyrimidines with quinoline-8-carboxylic acids according to (d) is carried out in known manner by reacting a reactive derivative, preferably an acid halide or a mixed anhydride with the amino compound preferably in the presence of an acid binding agent.

The hypoglycemic action of the benzenesulfonamidopyrimidines can be ascertained by administering them to normally fed rabbits in the form of the sodium salts in a dose of 10 mg./kg. of body weight and determining the blood sugar level according to the known method of Hagedorn-Jensen or by means of an auto-analyzer for a prolonged period of time.

The benzenesulfonamidopyrimidines of the present invention are preferably used for the manufacture of pharmaceutical preparations suitable for oral administration and for the lowering of the blood sugar level in the treatment of diabetes mellitus and may be used as such or in the form of their salts or in the presence of substances which cause such salt formation. For the formation of salts, there may be used, for example, alkaline agents such as alkali metal- or alkaline earth metal hydroxides, and alkali metal or alkaline earth metal carbonates or bicarbonates.

The present invention therefore also provides pharmaceutical preparations that have hypoglycemic action and are suitable for oral administration in the treatment of diabetes mellitus, which preparations have preferably the form of tablets and contain as the active ingredient a benzenesulfonamidopyrimidine of the invention or a salt thereof in admixture or conjunction with pharmaceutically suitable carriers, such as talc, starch, lactose, tragacanth and magnesium stearate.

A pharmaceutical preparation, for example, a tablet or a powder, containing the benzenesulfonamidopyrimidines of the invention or a salt thereof as the active substance, with or without one or more of the aforementioned carriers, is advantageously brought into a suitable dosage unit form. The dose chosen should comply with the activity of the benzenesulfonamidopyrimidine and with the desired effect. Advantageously, the dosage per unit amounts to about 1 to 100 mg., preferably 5 to 50 mg., but higher or lower dosage units may also be used, which, when required, are divided or multiplied prior to their administration.

The following Examples illustrate the invention:

EXAMPLE 1

4-(β-quinoline-8-carboxamido-ethyl)-N-(5-isobutyl 2-pyrimidinyl)-benzene-sulfonamide 3.8 g. of 2-amino-5-isobutyl-pyrimidine were suspended in 25 ml. of pyridine. 9.4 g. of 4-(β-quinoline-8-carboxamido-ethyl)-benzene-sulfochloride (M.P. 141–142° C., prepared from 4-β-quinoline-8-carboxamido-ethylbenzene and chlorosulfonic acid) were added while stirring and heated at 50° for 2 hours. Subsequently, the pyridine was distilled off (to a large extent) under reduced pressure, the residue was dissolved in concentrated hydrochloric acid, clarified in charcoal and the solution was adjusted at pH 4 with concentrated ammonia. The 4-(β-quinoline-8-carboxamido-ethyl)-N-(5 - isobutyl - 2 - pyrimidinyl)-benzene-sulfonamide precipitated was recrystallized from nitromethane and melted at 177° to 179°.

In an analogous manner, there were obtained:

4-(β-quinoline-8-carboxamido-ethyl)-N-(5-ethyl-2-pyrimidinyl)-benzenesulfonamide, M.P. 182–184° (from nitromethane);

4-(β-quinoline-8-carboxamidoethyl)-N-(5-propyl-2-pyrimidinyl)-benzenesulfonamide, M.P. 166–168° (from nitromethane);

4-(β-quinoline-8-carboxamido-ethyl)-N-(5-butyl-2-pyrimidinyl)-benzenesulfonamide, M.P. 181–182° (from nitromethane);

4-(β-quinoline-8-carboxamido-ethyl)-N-(5-ethoxy-2-pyrimidinyl)-benzenesulfonamide, M.P. 214–216° (from nitromethane);

4-(β-quinoline-8-carboxamido-ethyl)-N-(5-phenyl-2-pyrimidinyl)-benzenesulfonamide, M.P. 240–242° (from water-DMSO);

from 4-(β-6-chloro-quinoline-8-carboxamido-ethyl)-benzenesulfochloride, M.P. 151–153°;

4-(β-6-chloro-quinoline-8-carboxamido-ethyl)-N-(5-propyl-2-pyrimidinyl)-benzenesulfonamide, M.P. 162–163° (from nitromethane);

4-(β-6-chloro-quinoline-8-carboxamido-ethyl)-N-(5-isobutyl-pyrimidinyl)-benzene sulfonamide, M.P. 153–155° (from nitromethane).

EXAMPLE 2

4-(β-quinoline-8-carboxamido-ethyl)-N-(5-isobutoxy-2-pyrimidinyl)-benzene-sulfonamide 1 g. of triethyl-amine were added to 1.73 g. of quinoline-8-carboxylic acid in 30 ml. of acetone. 1.15 g. of chloroformic acid ethyl ester were dropped to the solution while cooling with ice, the whole was stirred again for a few minutes and the reaction mixture was slowly introduced in a cooled solution of 4-(β-aminoethyl)-N-(5-isobutoxy-2-pyrimidinyl)-benzenesulfonamide, which was obtained by saponification of 4.23 g. of 4-(β-ethoxy-carboxamido-ethyl)-N-(5 - isobutoxy-2-pyrimidinyl)-benzene-sulfonamide (M.P. 158°) with 10% sodium hydroxide solution and to which water, glacial acetic acid and acetone were added. The whole was stirred again for 1 hour, water was added to it and it was acidified with acetic acid. The 4-(β-quinoline-8-carboxamido-ethyl)-N-(5 - isobutoxy - 2 - pyrimidinyl)-benzenesulfonamide was filtered off with suction and recrystallized from ethanol. It melted at 188–190°.

In an analogous manner there were obtained from 4-(β-ethoxy-carboxamidoethyl)-N-(5-cyclohexyl-2-pyrimidinyl)-benzenesulfonamide, M.P. 167°;
4-(β-6-chloro-quinoline-8-carboxamido)-N-(5-cyclohexyl-2-pyrimidinyl)-benzenesulfonamide, M.P. 218–220° (from ethanol-DMF);
4-(β-6-bromo-quinoline-8-carboxamido)-N-(5-cyclohexyl-2-pyrimidinyl)-benzenesulfonamide, M.P. 217–219° (from ethanol-DMF).

In an analogous manner, there were obtained from 4-(β-ethoxy-carboxamido-ethyl)-N-(5-isopropyl-4-methyl-2-pyrimidinyl)-benzenesulfonamide, M.P. 157°;
4-(β-6-chloro-quinoline-8-carboxamido)-N-(5-isopropyl-4-methyl-2-pyrimidinyl)-benzenesulfonamide, M.P. 218–220° (from ethanol);
4-(β-6-bromo-quinoline-8-carboxamido)-N-(5-isopropyl-4-methyl-2-pyrimidinyl)-benzenesulfonamide, M.P. 227–229° (from ethanol-DMF).

In an analogous manner, there were obtained from 4-(β-ethoxy-carboxamido-ethyl)-N-(5-propyl-2-pyrimidinyl)-benzenesulfonamide, M.P. 162–163°;
4-(β-6-bromo-quinoline-8-carboxamido)-N-(5-propyl-2-pyrimidinyl)-benzene-sulfonamide, M.P. 203–204° (from methanol-DMF);
from 4-(β-ethoxy-carboxamido-ethyl)-N-(5-benzyl-2-pyrimidinyl)-benzenesulfonamide, M.P. 152–153°;
4-(β-6-bromo-quinoline-8-carboxamido)-N-(5-benzyl-2-pyrimidinyl)-benzenesulfonamide, M.P. 186–188° (from methanol-dioxane).

In an analogous manner, there were obtained:

4-(β-quinoline-8-carboxamido)-N-(5-isopropyl-4-methyl-2-pyrimidinyl)-benzenesulfonamide, M.P. 194–196° C.;
4-(β-6-chloro-quinoline-8-carboxamido)-N-(5-isobutoxy-2-pyrimidinyl)-benzenesulfonamide, M.P. 153–155° C.

EXAMPLE 3

4-(β-6-chloroquinoline-8-carboxamido-ethyl)-N-(5-ethyl-mercaptomethyl-2-pyrimidinyl)-benzenesulfonamide 1.9 g. of 5-chloroquinoline-8-carboxylic acid and 10 ml. of thionyl-chloride were refluxed for 3 hours. The excess of thionyl-chloride was distilled off *in vacuo* and the residue was suspended in 20 ml. of methylene chloride. This suspension was added portionwise to the solution of 3.0 g. of 4-(β-amino-ethyl)-N-(5-ethyl-mercaptomethyl-2-pyrimidinyl)-benzenesulfonamide in 4.5 ml. 2 N sodium hydroxide solution and 20 ml. of water while cooling with ice. The pH was adjusted at about 12 by gradually adding further sodium hydroxide solution. Stirring was continued for 1 hour, the pH being further maintained, if possible, at 12, then the solution was acidified with acetic acid and the methylene chloride was evaporated by heating. The crude product precipitated was dissolved in very dilute sodium hydroxide solution under heat; while cooling, the sodium salt of the compound desired was crystallized out and was recrystallized from about 0.1 N sodium hydroxide solution by the addition of active charcoal. The purified sodium salt was dissolved in hot water, the free final product was precipitated by acidification with acetic acid and recrystallized from ethylene chloride after drying. The 4-(β-6-chloroquinoline-8-carboxamido-ethyl)-N-(5-ethyl-mercapto-methyl - 2 - pyrimidinyl)-benzenesulfonamide obtained melted at 178–180° C.

The 4-(β-amino-ethyl)-N-(5 - ethyl-mercaptomethyl-2-pyrimidinyl)-benzenesulfonamide, M.P. 228–230° C. used as starting material was prepared by alkaline hydrolysis of 4-(β-ethoxy-carboxamido-ethyl)-N-(5-ethyl-mercaptomethyl - 2 - pyrimidinyl)-benzenesulfonamide, M.P. 156–158° C.

In an analogous manner, the following compounds were obtained:

2-(6-chloroquinoline-8-carboxamido)-N-(5-isobutyl-2-pyrimidinyl)-indane-5-sulfonamide, M.P. 248–250° C. (from isopropanol).

The 2-amino-N-(5-isobutyl-2-pyrimidinyl) - indane - 5-sulfonamide, M.P. 235–240° C., used as starting material, was obtained by alkaline hydrolysis of 2-(ethoxy-carboxamido)-N-(5-isobutyl-2-pyrimidinyl)-indane - 5 - sulfonamide, M.P. 160–161° C.

2-(6-chloroquinoline-8-carboxamido)-N - (5 - isobutyl-2-pyrimidinyl)-1,2,3,4-tetrahydronaphthalene - 7 - sulfonamide, M.P. 120–121° C. (after recrystallization from isopropanol the substance was again dissolved in very dilute sodium hydroxide solution and was precipitated with dilute acetic acid).

The 2-amino-N-(5-isobutyl - 2 - pyrimidinyl) - 1,2,3,4-tetrahydronaphthaline-7-sulfonamide, M.P. 244–245° C., used as starting material, was prepared by alkaline hydrolysis of 2-(ethoxycarboxamido)-N - (5 - isobutyl - 2 - pyrimidinyl)-1,2,3,4 - tetrahydronaphthaline - 7 - sulfonamide, M.P. 108–112° C.

We claim:
1. A sulfonamidopyrimidine of the formula

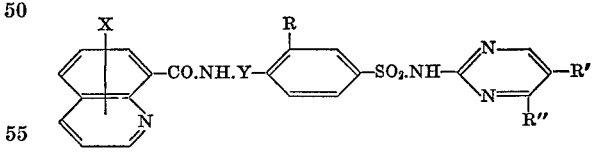

in which
X represents hydrogen, chlorine, bromine, methyl, methoxy
Y represents —CH(CH₃)—CH₂— or —CH₂—CH₂—
R represents hydrogen or R together with Y represents a bridge of 3 or 4 methylene groups,
R' represents alkyl, cycloalkyl, cycloalkylalkyl, phenyl, benzyl, alkoxy, cycloalkoxy, alkoxyalkyl, alkoxyalkoxy, alkylmercapto, alkylmercaptoalkyl, the alky containing, in any case 1 to 4 carbon atoms and the cycoalkyl containing, in any case 5 to 8 carbon atoms,
R" represents hydrogen, alkyl of 1 to 4 carbon atoms, R" and R' together being able to represent a ring of from 3 to 5 methylene groups.
2. A compound as defined in claim 1 wherein X is chlorine substituted in the 6-position, R and R" are hydrogen and R' is isobutyl.

3. A compound as defined in claim 1 wherein X is chlorine substituted in the 6-position R and R" are hydrogen and R' is propyl.

4. A compound as defined in claim 1 wherein X, R and R" are hydrogen and R' is propyl.

5. The compound of claim 1 which is 4-(β-6-chloro-quinoline-8-carboxamido - ethyl) - N - (5 - propyl - 2-pyrimidinyl)-benzenesulfonamide.

References Cited

UNITED STATES PATENTS 3,621,026  11/1971  Gutscht et al. _____ 260—256.5

RICHARD J. GALLAGHER, Primary Examiner

U.S. Cl. X.R.

260—287 R; 424—251